United States Patent [19]
Frederic

[11] Patent Number: 6,005,989
[45] Date of Patent: Dec. 21, 1999

[54] METHOD FOR MODIFYING THE RESOLUTION OF A DIGITIZED IMAGE

[75] Inventor: Alain Frederic, Eragny, France

[73] Assignee: Sagem SA, Paris, France

[21] Appl. No.: 08/768,455

[22] Filed: Dec. 18, 1996

[30] Foreign Application Priority Data

Dec. 28, 1995 [FR] France .................. 95 15668

[51] Int. Cl.$^6$ .............. G06K 9/32; H04N 1/00
[52] U.S. Cl. ............. 382/300; 382/254; 382/256; 382/258; 382/266; 382/274; 382/299; 382/318; 382/319; 382/321; 358/400; 358/403; 358/407; 358/408; 358/428; 358/525
[58] Field of Search .............. 382/300, 299, 382/317, 318, 319, 321, 254, 256, 258, 266, 274; 358/428, 525, 400, 403, 407, 408

[56] References Cited

U.S. PATENT DOCUMENTS

| | | | |
|---|---|---|---|
| 4,538,299 | 8/1985 | DeForest | 382/21 |
| 4,575,769 | 3/1986 | Arnoldi | 358/285 |
| 4,808,984 | 2/1989 | Trueblood et al. | 340/723 |
| 4,931,954 | 6/1990 | Honda et al. | 364/518 |
| 4,989,096 | 1/1991 | Webb et al. | 358/298 |
| 5,023,919 | 6/1991 | Wataya | 382/263 |
| 5,029,108 | 7/1991 | Lung | 364/519 |
| 5,134,495 | 7/1992 | Frazier et al. | 358/298 |
| 5,231,519 | 7/1993 | Koike | 358/456 |
| 5,359,423 | 10/1994 | Loce | 358/296 |
| 5,392,137 | 2/1995 | Okubo | 358/462 |
| 5,611,036 | 3/1997 | Berend et al. | 395/141 |
| 5,696,848 | 12/1997 | Patti et al. | 382/254 |
| 5,717,781 | 2/1998 | Ebel et al. | 382/141 |

FOREIGN PATENT DOCUMENTS 2185456  1/1989  Japan.

Primary Examiner—Leo H. Boudreau
Assistant Examiner—Kanji Patel
Attorney, Agent, or Firm—McDermott, Will & Emery

[57] ABSTRACT

In a method for modifying the resolution of an image obtained by digitising a real image, the digitised image includes a plurality of pixels of a particular intensity. The outlines in the digitised image are studied and isolated and additional pixels are created by interpolation of the intensities of original pixels located on one side of an outline to form an image with a modified resolution. The studying of outlines is achieved by locating, for close pixels, the intensity transitions representative of a gradient exceeding a particular threshold. The method is utilized for modifying the image resolution of facsimile machines.

4 Claims, 2 Drawing Sheets

METHOD FOR MODIFYING THE RESOLUTION OF A DIGITIZED IMAGE

BACKGROUND OF THE INVENTION

The invention relates to a method for modifying the resolution of a digitised image.

The digitising of images makes it possible to transmit and store the said images with no risk of degradation. It is mainly used in facsimile machines.

The image of a document to be transmitted is digitised pixel by pixel (or element by element) by a reading head of a scanner with which a digital value representing the intensity of grey shade read from the document is allocated to each pixel position. For restitution in black and white the shade value is compared with a mid-grey threshold to provide a 0 or 1 bit representing white or black.

In the receiving fax machine, a printer reconstructs the pixels, black or white, with the numbers of pixels per millimetre, horizontally and vertically, identical to those of the analysing head, for example, 8 pixels/mm horizontally and 7.7 pixels/mm vertically.

These numbers of pixels determine the resolution of the reconstructed digitised image and are a compromise between obtaining a good quality image at a high resolution and the transmission of a limited number of bits.

However, for some time now printers with improved resolution, such as laser printers, have been in existence. The Applicant has thus sought to use these printers to improve the resolution of the restored image.

Until then, when these laser printers were used to print a fax message its resolution was degraded in order to match it to that of a fax machine. More precisely, as the printer can only be controlled according to its own resolution, for example, 12 pixels/mm, a given number of consecutive pixels of the received image (8 pixels/mm horizontally) were transformed into a greater number of pixels representing in total the same image length (for example, from 2 to 3). This created a distortion since, continuing with the example given above, in the case of the presence of two original pixels of different values, white and black, a sort of summary smoothing was produced when restoring, between these two different pixels, the third pixel in the form of a white or black pixel, while an average, or grey, should in fact have been restored from the other two. In other words, the "grain" of the image was locally increased or decreased and this distortion degraded the image. Furthermore, for the practical reasons of volume of equipment and calculation, this above method can only be applied for simple ratios in the change of resolution.

The Applicant has thus sought to exploit fully the resolution of the printer by changing the resolution of the received image in a way which is independent of the relationship between the initial and final resolutions, horizontally and vertically, while limiting the distortion introduced by this operation.

SUMMARY OF THE INVENTION

To this end the invention relates to a method for modifying the resolution of an image obtained by digitising a real image, the digitised image being comprised of a plurality of pixels of a particular intensity, wherein:

the outlines in the digitised image are searched and isolated and additional pixels are created by interpolation of the intensities of original pixels located on one side of an outline to form an image with a modified resolution.

Thus the image obtained by interpolation is a buffer image reproducing the original real image, from which the grain linked to the resolution of the original digitised image has disappeared, this makes it possible to be independent of the relationship between the image resolutions.

This removal of the grain, however, is not achieved at the expense of the resolution. Indeed, the exclusion of any interaction or migration between pixels separated by an outline avoids a loss of resolution during interpolation because only the relevant data are taken into consideration, ie, those relating only to relatively homogeneous zones of the image. An outline separating a light zone and a dark zone thus preserves, where it is crossed, an abrupt transition, with no degradation. The interpolation also makes it possible to choose any intermediate position desired between the positions of the original pixels in order to sample the interpolated image according to a new resolution while restoring the nuances between adjacent original pixels.

The image can be a black and white or a colour image, with or without intermediate levels of pixel intensity.

BRIEF DESCRIPTION OF DRAWINGS

The invention will be better understood with the aid of the following description of the preferred embodiment of the method of the invention, with reference to the attached drawing in which.

DETAILED DESCRIPTION OF THE INVENTION

Figure 1:
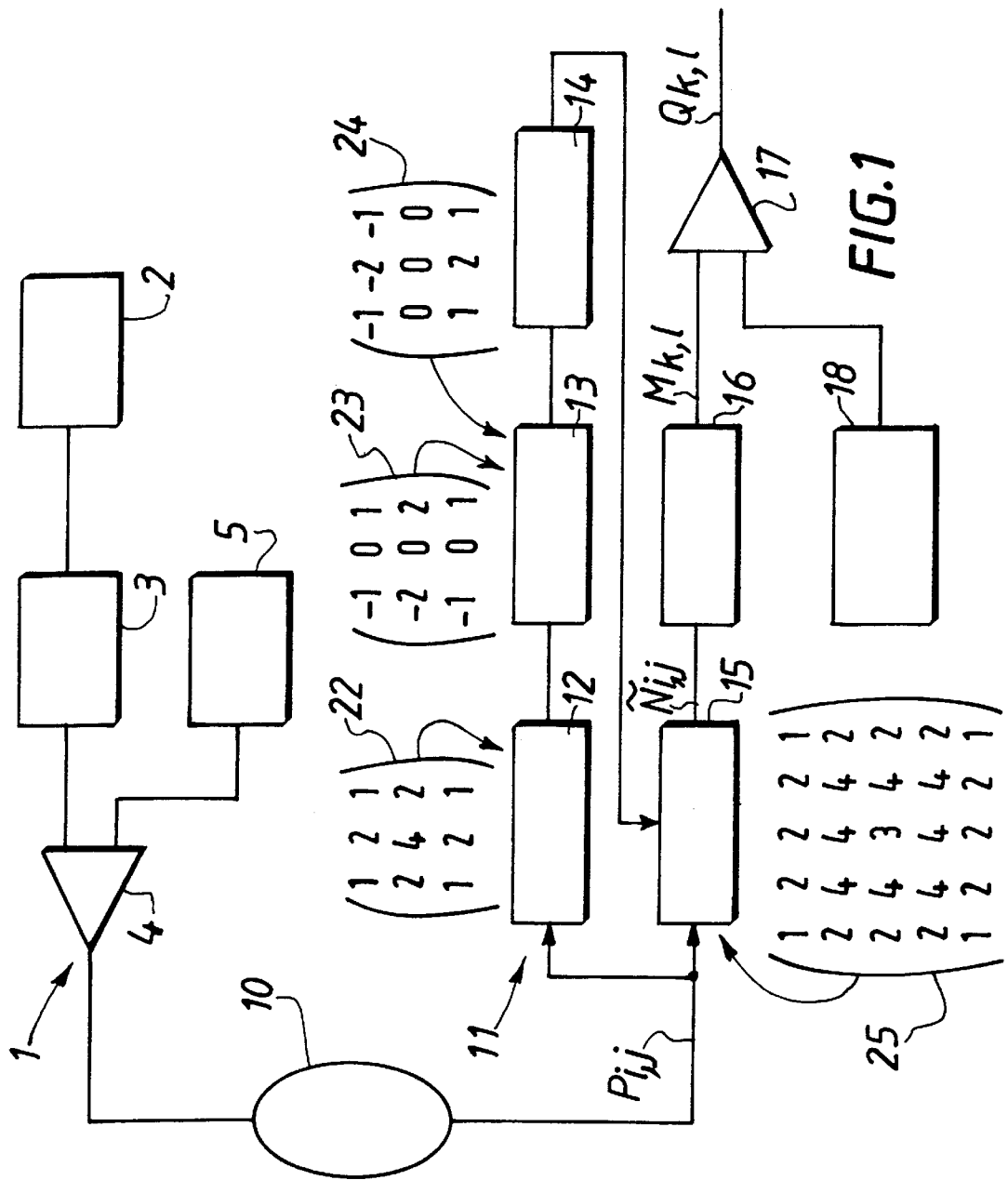
FIG. 1 is a block diagram of a standard document analysis sequence in a fax machine and an image restitution sequence, implementing the method of the invention.

The analysis sequence 1, or scanner, of FIG. 1 belongs to a fax machine and comprises, in the order of propagation of the image signals, a photosensitive sensor 2, in this case a CCD, an analogue/digital convertor 3 and a comparator 4 comparing the sampled level of intensity of the image pixels of a document analysed by the CCD 2 with a threshold intensity value representing an average intensity stored in a register 5. This example relates to a black and white analysis of the image so that the intensity signals represent grey scales. A colour analysis of the image would proceed on the same principle. The comparator 4 is connected at the output to the switched telephone network STN 10.

The image restitution sequence 11 of another fax machine comprises, from its input connected to the STN 10, at its output for control of a laser printer, not shown, a circuit 15 for assessment of the original image, an interpolation circuit 16 and a comparator 17 receiving a mid-grey intensity threshold value, stored in a register 18. The STN 10 also supplies with facsimile data Pij an outline extraction sequence comprised of a smoothing circuit 12, a gradient calculating circuit 13 and a threshold comparator circuit 14 controlling the circuit 15.

The circuits 12–16 are specifically intended to implement the method of the invention in order to operate the laser printer at a resolution of 600 pixels per inch, about 24 pixels per millimetre, in this example using the signals produced by the CCD 2 with a resolution of 8 pixels/mm horizontally and 7.7 pixels/mm vertically.

In order to modify the resolution of the original image obtained by digitising the real or optical image of the document, comprised of a plurality of pixels of a particular intensity, the outlines in the digitised image are studied and isolated and additional pixels are created by interpolation of the intensities of original pixels located on one side of an outline to form an image with a modified resolution.

For the first phase, mentioned above, relating to the outlines, the three circuits 12–14 serve to produce a map of the outlines in order then to control processing of the digitised image in the circuits 15–16. The circuits 12–14 respectively smooth the intensities of the pixels of the original digitised image, calculate a gradient of intensity between neighbouring pixels with smoothed intensities and compare the gradients with a threshold to provide an image or map of outlines.

With respect to the second phase, the digitised image which is then processed can be considered as having three "dimensions": horizontal, vertical and level of intensity of the pixels of a sampling matrix. Each of these three dimensions presents a quantification, linked respectively to the path of analysis, horizontal and vertical, and to the digitising of the intensities in discrete values, in this case limited to two values, white or black. It is thus a matter of eliminating the three above-named quantifications in order to restore, in electronic form, the original optical image by a transformation in reverse to that carried out in the analysis sequence 1. The receiving fax machine can thus be the equivalent of a photocopier.

The two phases mentioned above will now be successively described in detail.

In association with circuit 12 is shown a matrix 22 for weighting the intensities of pixels in a limited zone of the original digitised image, in this case 3×3 pixels, while two matrices 23, 24 for calculating the gradient respectively in the horizontal, or line direction and the vertical direction are associated with the circuit 13.

The matrix 22 is centred, in this case successively, on each pixel of the original digitised image to calculate a composite value of grey intensity, taking into account the black or white intensity of the pixel in question and those of the pixels which surround it, using a law of weighting which is an inverse function of the distance between the central pixel and each of the other pixels. Inverse function is to be understood to mean a function of which the direction of variation is different from that of the variable no matter what the sensitivity of the function to the variations of the variable. The weighted average thus obtained represents, for the pixel in question, a level or density per surface unit of mid-grey of the zone considered of the original optical image, without, however, cancelling out the "relief" of grey since the most distant pixels only have a reduced influence. Thus an assessment of the original optical image is obtained, from which, by smoothing, the quantification of intensity due to the black/white coding has practically disappeared.

From this image, which has no intensity quantification "noise", the circuit 13 calculates the gradient of the intensities of grey in two directions which in this case are perpendicular. As shown by the weighting matrix 23, which is asymmetrical with respect to its vertical axis, three consecutive pixels of one line supply a partial result of the weighting of their smoothed intensities which is positive if the right pixel has a smoothed intensity greater than that of the left pixel, a partial result which otherwise is negative in the opposite case. The three partial results of the three lines cumulatively supply a signed number representing the intensity gradient Gh in the horizontal direction. As will be noted, the second line, comprising the central pixel in question, has a greater weighting than that of the two others. The gradient Gv in the vertical direction is determined by the same principle by means of the matrix 24 which corresponds to the matrix 23 turned by a quarter turn. The matrices 22 and 23 thus present a Gaussian characteristic in two dimensions.

A quadratic composition of the two gradients Gh and Gv provides the maximum gradient G of which the direction can be defined, as required, as being the line of the greatest inclination in a plane tangent to the "relief" of the smoothed intensities, a plane defined by two vectors represented by Gh and Gv.

The image of the intensities having thus been replaced by an image of the gradients of these intensities, the comparison of the latter image with a gradient threshold in the circuit 14 makes it possible to locate, for the close pixels, the transitions of intensity representative of a gradient exceeding the threshold and to draw up a map of the outlines. It will be noted that the outlines could be determined in another way, for example, by use of the Laplacian.

The intensity transitions greater than the threshold represent limits between details of the original image having clearly different grey scales, while the low amplitude grey transitions within the same detail are not detected.

In this example, two possible gradient thresholds are provided depending on the type of image, selected by manual control or optical recognition. In the case of the presence of characters in the image which will present abrupt transitions, the threshold is regulated to a relatively high threshold S1, while in the opposite case, or if the image is of the photograph type, the threshold has a lower value S2.

Having thus isolated the outlines the image described above is then processed in the circuits 15–16 for the second phase.

For this purpose, before proceeding with the interpolation of neighbouring pixels, values weighted depending on the intensities of the original pixels close to the pixels of the intensity to be weighted are substituted for the intensities of the original pixels. To this end smoothing is then carried out between close pixels on the original pixel intensities in the circuit 15 by means of a smoothing matrix 25.

Then the weighting of the intensities of the original image pixels surrounding the central pixel is an inverse function of their distances from this central pixel of the intensity to be weighted. It will be understood that all the values indicated for the matrices are only one particular example. The smoothing successively applies to all the pixels of the original digitised image but is of particular interest in the zones of the image comprising considerable transitions, ie along the outlines. In this particular example of a transmission of binary signals, of black or white, in which the comparator 4 is liable to switch very frequently, when the optical image has a grey adjoining the threshold, and thus to create considerable quantification noise in the initially homogeneous zones, the above-mentioned smoothing has the advantage of removing this noise and of reestablishing the homogeneous nature of the noisy zones, outside the outlines.

When the matrix 25 is located in a zone of the original digitised image comprising an outline the coefficients of the matrix 25 separated from the central pixel in question are reduced and even, in this example, become 0.

For this reason only the intensities of the pixels on the same side of the outline as the central pixel are taken into account, so that the average value of the grey scale of these pixels is preserved as a whole by only considering original pixels of neighbouring intensities, by retaining a segregation between intensity data relating to details having very different levels of intensity. Thus an assessment $N_{i,j}$, is obtained of grey scales of the original digitised image before black/white quantification by the comparator 4.

Having thus a raster of the grey intensities of the original image, a raster quantified in space according to the horizontal and vertical paths of the resolution of the transmitting fax machine, a law of interpolation, in this case linear, is then used to define a value of intensity for any intermediate position desired. Thus by means of interpolation a continuous image is defined representing the original optical image and from which quantifications of the grey scales and position of pixels introduced by the transmitting fax machine have been almost eliminated. The receiving fax machine thus has the electronic equivalent of the optical image and can thus sample it according to the desired resolution, in this case 24 pixels/mm. In some applications it may even be desirable to turn the image. Of course, the invention is applicable in the case of a reduction in resolution to control an image restoring device not adapted to the sequence 1.

Figure 2:
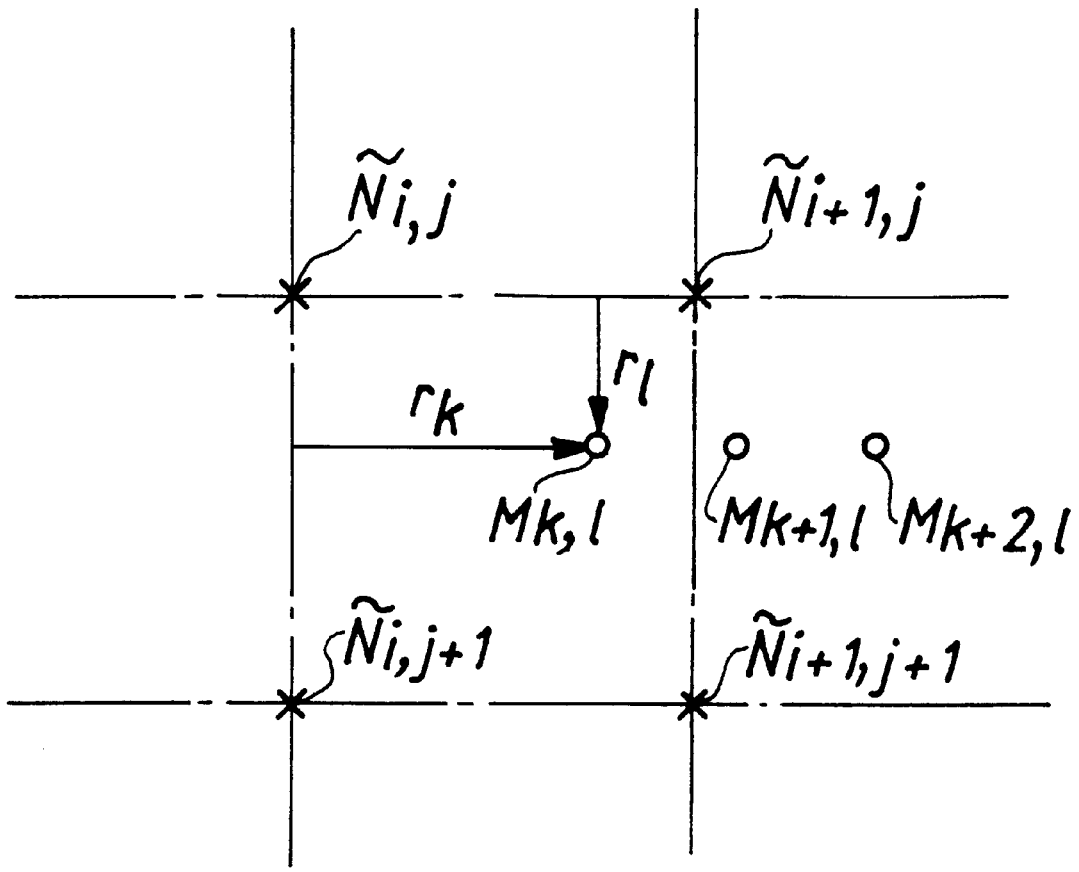
FIG. 2 illustrates the interpolation between pixels.

FIG. 2 illustrates the principle of interpolation.

Four pixels of a rectangular block or mesh of the original image have respective smoothed intensities $\tilde{N}i, j$, $\tilde{N}i+1, j$, $\tilde{N}i, j+1$ and $\tilde{N}i+1, j+1$. The position of each pixel is located by the theoretical centre of the pixel in the matrix of original pixels. Conveniently the pixels are located by their smoothed intensity.

In order to sample according to another resolution, ie to create additional pixels according to a new grid of resolution, a matrix of pixels such as Mk, l, Mk+1, l and Mk+2, l is placed on the matrix comprising the pixels Ni, j of the original image.

The pixel Mk, l being framed by the four other pixels such as $\tilde{N}i, j$, a weighting, which varies in a linear manner from 0 to 1 depending on whether the pixel Mk, l is—horizontally or vertically (rk, rl)—distant from or close to the pixel such as $\tilde{N}i, j$ in question, is applied to the intensity of each of these four other pixels.

The smoothed interpolated intensity is defined as follows:

$$Mk, l = \left[[rk \times \tilde{N}i+1, j+(1-rk)\tilde{N}i, j] \times (1-rl) + [rk \times \tilde{N}i+1, j+1+(1-rk)\tilde{N}i, j+1] \times rl\right]/2$$

In a standard manner, the comparator 17 thus provides a quantified signal Qk, l for control of the printer.

Spatial filtering including a more extensive zone than the above mesh and taking account of the series of aligned pixels passing through the point Mk, l in question can also be envisaged.

It will be noted that the two steps, smoothing and then interpolation, can be merged into a single step of interpolation which would take account of a larger number of unsmoothed original pixels, ie the coefficients of the matrix 25 would be slightly modulated depending on the offsetting of the position of the new pixel Mk, l with respect to the centre of this matrix 25.

I claim:

1. A method for modifying the resolution of an image obtained by digitising a real image, the digitised image being comprised of a plurality of original pixels of a particular intensity, comprising the steps of:

searching and isolating the outlines of the digitised image;

creating additional pixels by interpolating the intensities of original pixels located on one side of an outline to form an image with a modified resolution;

substituting values weighted depending on the intensities of the original pixels close to the pixels of the intensity to be weighted for the intensities of the original pixels, before proceeding with the interpolating; and weighting the intensities of the original pixels using the inverse functions of their distances from the pixels of the intensity to be weighted.

2. The method according to claim 1, further comprising studying the outlines of the digitised image by locating, for close pixels, the intensity transitions representative of a gradient exceeding a particular threshold.

3. The method according to claim 2, further comprising studying the gradient by utilizing a weighting matrix which is applied to the intensities of the pixels of a matrix of pixels.

4. The method according to claim 1, further comprising creating additional pixels by considering only the original pixels of neighbouring intensities.

\* \* \* \* \*